(No Model.) 5 Sheets—Sheet 1.
C. H. COGGESHALL.
CHECK MARKER.
No. 530,470. Patented Dec. 4, 1894.
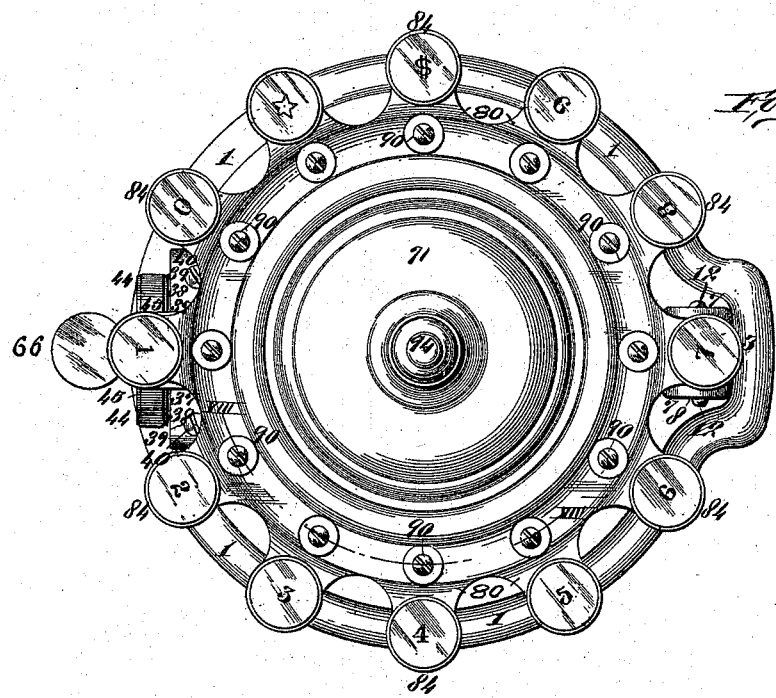
Fig. I.
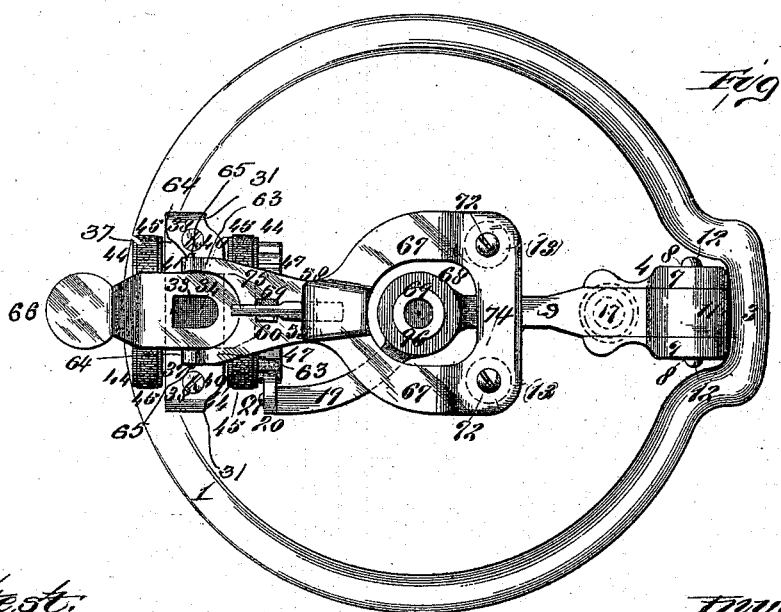
Fig. II.
Attest:
Inventor:
Carol. H. Coggeshall.
By Knight Bro's.
Attys.

(No Model.) 5 Sheets—Sheet 2.
C. H. COGGESHALL.
CHECK MARKER.
No. 530,470. Patented Dec. 4, 1894.
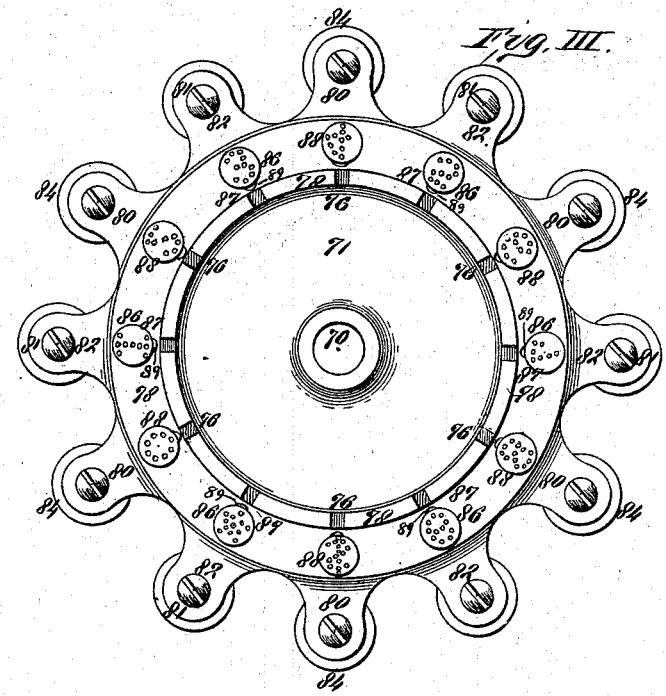
Fig. III.
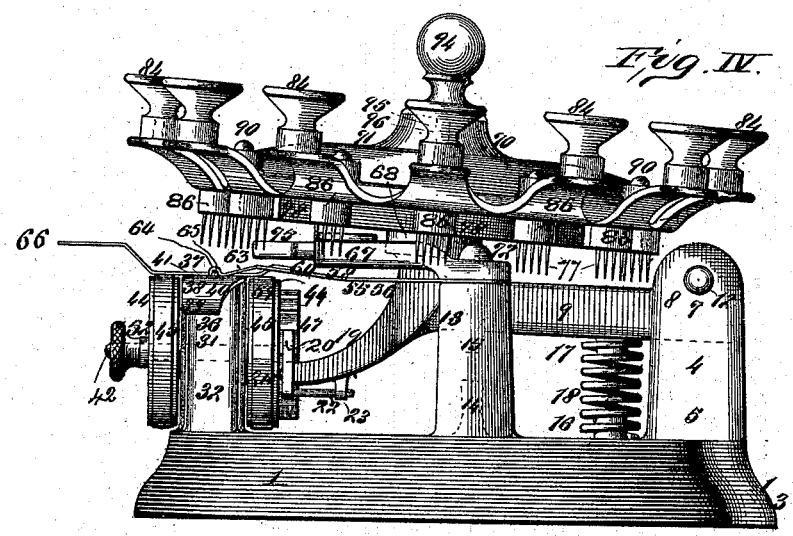
Fig. IV.
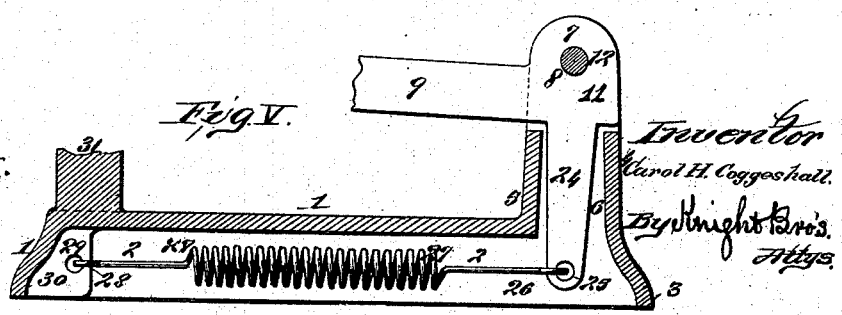
Fig. V.
Attest
Benj. A. Knight.
C. G. Edwards.
Inventor
Carol H. Coggeshall.
By Knight Bro's
Attys.

(No Model.)　　　　　　　C. H. COGGESHALL.　　　　5 Sheets—Sheet 3.
CHECK MARKER.
No. 530,470.　　　　　　　　　　Patented Dec. 4, 1894.
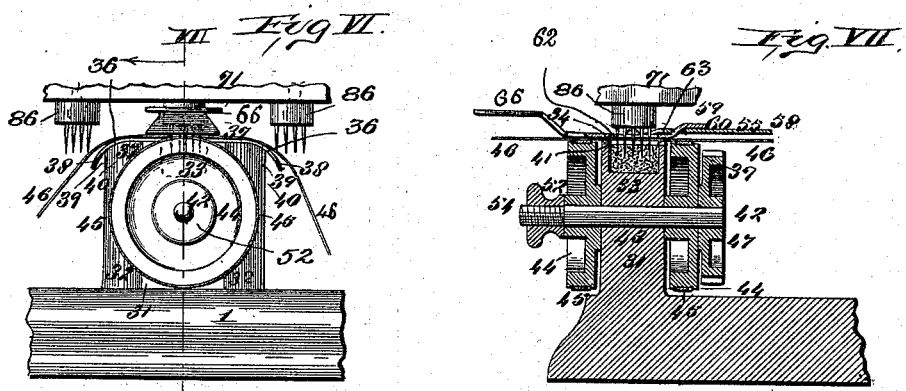
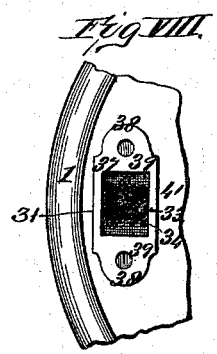
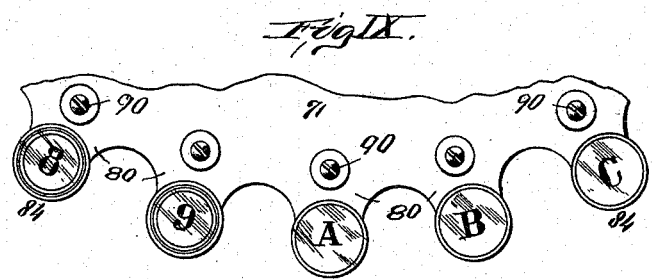
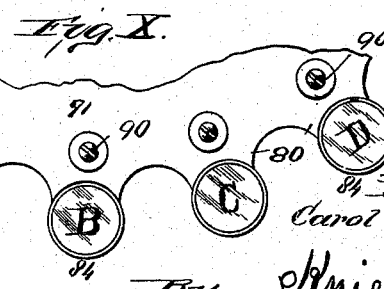
Attest:　　　　　　　　　　　　　　　Inventor:
Wm. H. ─── H.　　　　　　　　　　　Carol H. Coggeshall,
Benj. A. Knight.　　　　　　　By Knight Bro's
　　　　　　　　　　　　　　　　　　　Attys.

(No Model.)　　　　　C. H. COGGESHALL.　　　5 Sheets—Sheet 4.
CHECK MARKER.
No. 530,470.　　　　　　　　　　Patented Dec. 4, 1894.
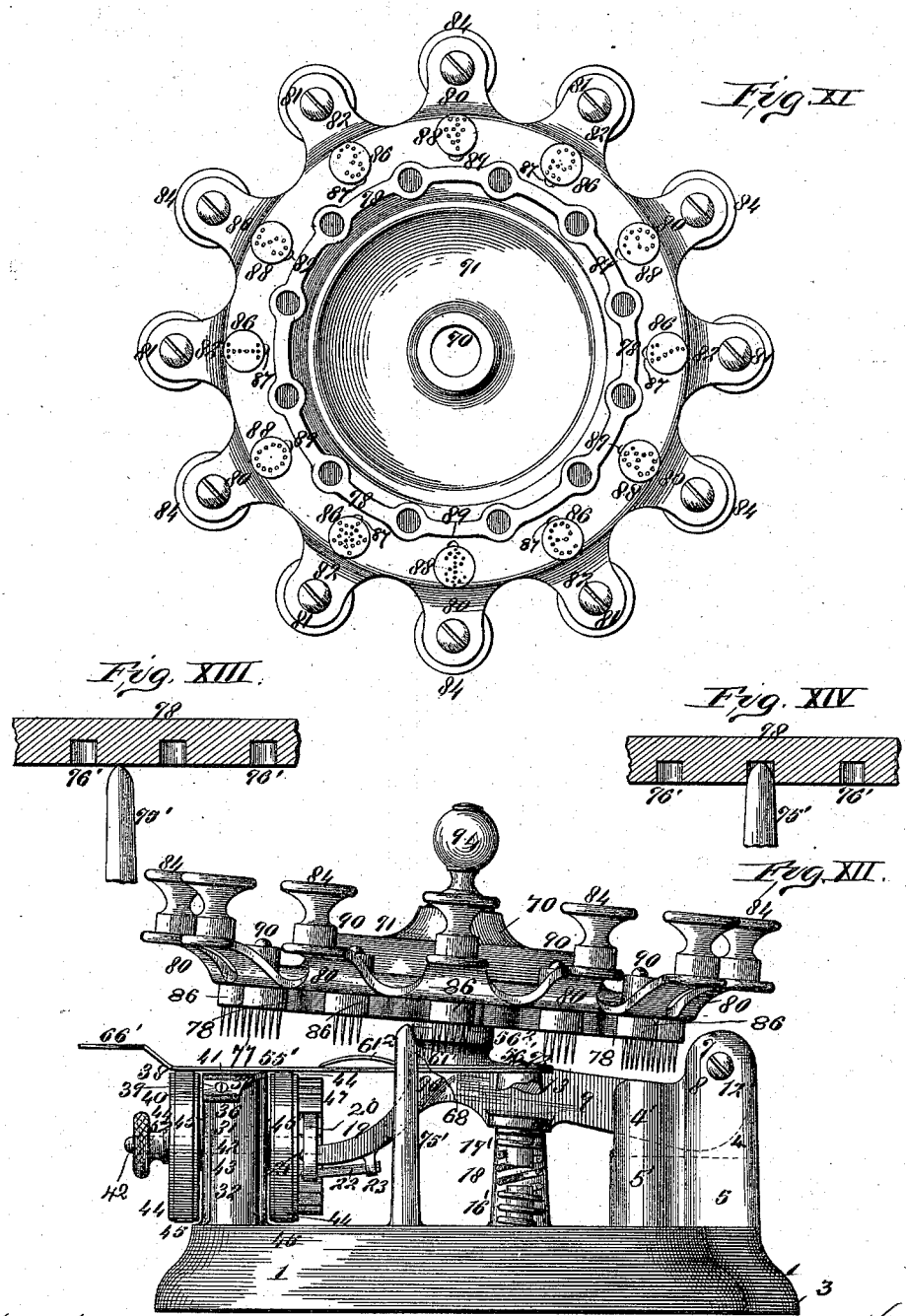

(No Model.)                    C. H. COGGESHALL.                5 Sheets—Sheet 5.
                                  CHECK MARKER.
No. 530,470.                                        Patented Dec. 4, 1894.
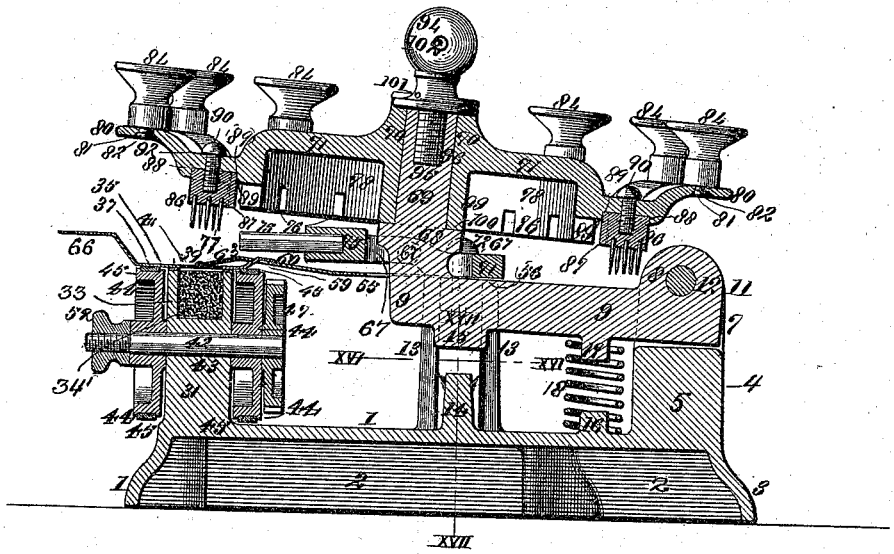
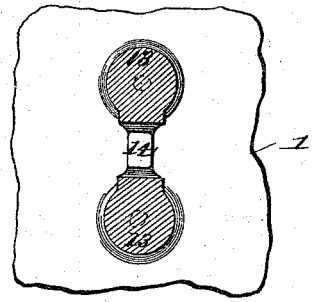
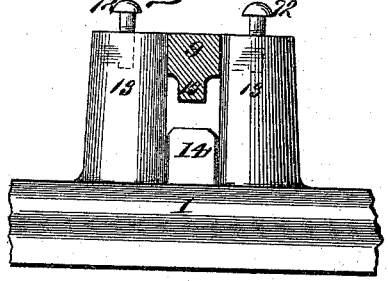
Attest
Benj. A. Knight.
C. G. Edwards.
Inventor:
Carol. H. Coggeshall.
By Knight Bros.
Attys.

UNITED STATES PATENT OFFICE.

CAROL H. COGGESHALL, OF ST. LOUIS, MISSOURI, ASSIGNOR TO THE COGGESHALL CHECK MARKER COMPANY, OF SAME PLACE.

CHECK-MARKER.

SPECIFICATION forming part of Letters Patent No. 530,470, dated December 4, 1894.

Application filed December 9, 1893. Serial No. 493,213. (No model.)

*To all whom it may concern:*

Be it known that I, CAROL H. COGGESHALL, a citizen of the United States, and a resident of the city of St. Louis, in the State of Missouri, have invented certain new and useful Improvements in Check-Markers, of which the following is a specification.

My invention relates to a machine for effecting a perforate ink outlined and indelible marking for checks or other paper which outlines any required letter, number, or other mark, which mark is co-existent with that of the check or other paper it marks, and my improvements consist in features of novelty hereinafter fully described and claimed.

In order that my invention may be fully understood I will proceed to describe it with reference to the accompanying drawings, in which—

Figure I is a top view of my improved check-marker. Fig. II is a top view of the lower portion of the machine, beneath the marker-head. Fig. III is a bottom view of the marker-head. Fig. IV is a side elevation of the machine. Fig. V is a detail vertical section of the base of the machine. Fig. VI is a detail front view of the machine. Fig. VII is a detail vertical section of that which is shown in Fig. VI on the line VII—VII. Fig. VIII is a detail top view of the front standard. Fig. IX is a detail top view of the marker-head. Fig. X is a modification thereof. Fig. XI is a bottom view of a marker-head showing a modification. Fig. XII is a side elevation showing a modified construction of the machine. Fig. XIII and XIV are detail vertical sections of the modified form of marker-head. Fig. XV is a vertical longitudinal section of the machine. Fig. XVI is a horizontal section of the intermediate standard on the line XVI—XVI Fig. XV. Fig. XVII is a detail vertical section of the machine on the line XVII—XVII Fig. XV.

1 is the base of the machine which may be either hollow as shown in Figs. V and XV providing a chamber 2 or solid as shown in Fig. VII and formed with a rear extension 3 surmounted by a rear standard 4 constructed integral therewith either with a hollow lower part 5 providing a chamber 6, see Fig. V or solid. The upper part of the rear standard is formed with a pair of cheek plates 7 having transverse holes 8 for the reception of a screw bolt 12 forming a fulcrum for a forwardly extending swinging spring arm 9; the heel 11 of which fits between the cheek plates.

Located in a position intermediate of the front and rear parts of the base and integral therewith are standards 13, between which the spring arm 9 is guided in its vertical movements, and a stop 14 having a flat top receiving the impact of a pendent lug 15 formed on the spring arm and limiting the downward movement of the latter. Integral with the base and located between the rear and intermediate standards is a short boss 16 and formed on the spring arm above this boss is a pendent short boss 17. Surrounding these bosses and supporting the spring arm in its normal position on the base is a coil spring 18. Formed also on the spring arm and extending from one side thereof is a downwardly and laterally curved arm or extension 19 provided at its outer end with a vertically arranged pawl 20 secured thereto by a screw 21 and held in normal position by a rod 22 secured to the bracket 23 on the curved arm.

Depending from the heel 11 of the spring arm as shown in Fig. V, within the chamber 6 of the standard 4 is an arm 24 having an opening 25 with which is connected a hooked end 26 of a coil spring 27 located in the chamber 2 of the base; the other hooked end 28 of the spring, engaging an opening 29 in a fin 30 formed on the base. I have shown both vertical and horizontal springs, the vertical spring being adapted to lift the swinging arm while the horizontal spring acts to draw or pull the arm to normal position in conjunction therewith; but in small machines either one of the two springs may be used separately.

31 is a broad standard located at the front of the base and formed integral therewith and having rounded ends 32, and an ink-well 33 in the upper part thereof. This well is provided with a filling of bristles or a porous wad 34 immersed in indelible ink. The upper end of the front standard has a flat top providing a table 35 surrounding the well and downwardly curved ends 36 covered by the smooth polished plate 37 having correspondingly curved ends 38, well-opening 41, and holes 39 through which are inserted the retaining screws 40.

42 is a shaft journaled in a bearing 43 in the front standard having fixed inner and outer paper carrying wheels 44; each wheel being provided with a rubber face or tire 45. The check, or other paper, 46 is placed on these wheels which carry it over the table. Fixed to the shaft alongside the inner wheel is a ratchet-wheel 47 whose teeth are engaged by the pawl 20 each time the spring arm rises after its depression thus turning the shaft and advancing the check or other paper one space at a time.

52 is a milled finger nut located on the screw-threaded end of the shaft 42 for securing the latter.

55 is a spring plate, the rear arms 56 of which extend on each side of the centrally located stem 68 of the spring arm 9 and have their inner ends resting on the tops of the intermediate standards. The spring plate is formed with a contracted curved portion 58 in front of the stem and with a slot 59 in front of the curved portion. The slot receives an upwardly curved tongue 60 of a pressure plate 61 which surmounts the front standard and holds the check from shifting. The pressure plate 61 is formed with an aperture 62 which registers with the well opening 41 in the table plate and with the mouth of the ink-well. The spring plate is also formed with front arms 63 which straddle the pressure-plate and are provided with hooks 64 which engage pins 65 projecting from the sides of said plate. The pressure plate is provided with a finger piece 66 by which it is lifted for the insertion or removal of the check.

67 is a metal yoke or frame which surrounds the upwardly projecting stem 68 formed on the spring arm 9. The stem is provided with an arbor 69, which receives the hub 70 of the horizontally inclined rotatable marker-head 71. The rear portion of the yoke is secured by screws 72, which extend through the rear arms of the spring plate into the tops of intermediate standards.

75 is a locking pin projecting from the front end of the yoke for engaging in the slots 76 formed in the pendent ring 78 of the marker-head opposite the needle holders or markers 86. The entrances to the slots may be slightly flaring to facilitate the entry of the locking-pin. The marker-head is formed at its periphery with upwardly curved arms 80 having countersunk holes 81 for the heads of screws 82 which engage with the shanks of finger-knobs 84 surmounting said arms, the knobs being provided with the usual figures, or marks as shown.

86 are circular needle-holders or markers provided with needles 77 conforming in arrangement to the mark they are intended to produce by perforating the paper. The needle holders are provided with feathers 87 on their inner sides fitting in grooves 89 formed in the pendent ring 78 and seat in the sockets 88 in the curved arms.

90 are screws inserted in the curved arms and securing the needle-holders thereto.

94 is a central knob having a screw-threaded stem 95 entering the threaded socket 96 in the arbor for holding the marker-head on the stem. The knob 94 is provided with a transverse hole 102 for the reception of a key for turning it and with a lubricating orifice 101.

In the modification shown in Figs. XI, XII, XIII and XIV the frame or yoke 67 is dispensed with and instead of the spring plate 55 and pressure plate 61 I substitute a pressure plate 55' having ends 56' secured by screws 72 to the intermediate standards.

Located above the spring plate and also secured by the same screws to the standards is a spring plate 61' having a curved front end 61² bearing upon the pressure plate and holding it down on the table-plate. This pressure plate is also provided with a finger 66' by which it may be lifted for the insertion of the check. In this modification the locking device consists of posts or pillars 75' whose rounded tops enter circular sockets 76' so as to bring the marker-head to correct position. The rear standard is formed with a solid extension 5' surmounted by cheek-plate-extensions 4' for guiding the swinging arm. This enlarged standard may be formed hollow if it is desired to employ the pendent arm 24 and horizontal spring 27. In this construction the stop 14 and pendent lug 15 and the short bosses are dispensed with and the elongated bosses 16' and 17' substituted therefor and located between the intermediate standards 13, the lower boss 16' providing a stop and the upper boss 17' providing an impact lug.

Having thus described my invention, the following is what I claim as new therein and desire to secure by Letters Patent:

1. The combination of the base, having a rear standard, a front standard, and intermediate standards, the swinging spring arm hinged to the rear standard and extending forwardly between the intermediate standards, to the vicinity of the front standard, said spring arm having an upwardly projecting stem formed with an arbor and a marker-head rotatable on the stem around the arbor; substantially as described.

2. The combination of the hollow base having a rear standard and a front standard formed with an ink-well, the swinging spring arm, hinged to the rear standard and extending forwardly, having an upwardly projecting stem, and a marker-head rotatable on the stem, having needle-holders; substantially as described.

3. The combination of the base having a rear standard, and a front standard formed with an ink-well, the table-plate having a well-opening, the swinging spring arm, hinged to the rear standard and extending forwardly, having an upwardly projecting stem and a marker-head rotatable on the stem; substantially as described.

4. The combination of the base, the swinging spring arm, hinged to the base, and extending forwardly having an upwardly projecting stem, and a marker-head rotatable on the stem, having upwardly curved arms, provided with finger knobs; substantially as described.

5. The combination of the base, having a rear standard, intermediate standards, and a front standard formed with an ink-well, and the swinging spring arm hinged to the rear standard and extending forwardly between the intermediate standards, having an upwardly projecting stem, a marker-head rotatable in the stem, having needle holders; substantially as described.

6. The combination of the base, the intermediate standards having a stop between them, the swinging spring arm hinged to the base, formed with a pendent lug located over the stop, and with an upwardly projecting stem, and a marker-head rotatable on the stem; substantially as described.

7. The combination of the base having a rear standard, a boss adjacent thereto, and intermediate standards having a stop between them, the swinging spring arm hinged to the base formed with a boss, adjacent to the rear standard, with a pendent lug over the stop, and with an upwardly projecting stem, the coil spring surrounding the bosses between the base and the spring arm, and a marker-head rotatable on the stem; substantially as described.

8. The combination of the base, having a rear hollow standard, a swinging spring arm hinged to the rear standard and extending forwardly having a pendent arm located within the standard, and an upwardly projecting stem, a coil spring located between the base and the spring arm, a coil spring located in the base, connected at one end to the base and at the other end to the pendent arm, and a marker-head rotatable on the stem; substantially as described.

9. The combination of the base, the swinging spring arm hinged to the base and extending forwardly having an upwardly projecting stem, the yoke extending around the stem and secured to the base having a locking pin projecting forwardly therefrom, and a marker-head rotatable on the stem, having a pendent ring formed with slots which receive the locking pin; substantially as described.

10. The combination of the base having a front standard, the swinging spring arm hinged to the base, and extending forwardly having an upwardly projecting stem and a downwardly, outwardly and forwardly extending extension, a pawl pivoted to the extension, the shaft mounted in the standard, having fixed carrying wheels and a ratchet-wheel and a marker-head rotatable on the stem; substantially as described.

11. The combination of the base, having a front standard, and intermediate standards, the swinging spring arm, hinged to the base and extending forwardly, having an upwardly projecting stem, the spring plate secured to the intermediate standards, the pressure plate extending over the table and a marker-head rotatable on the stem; substantially as described.

12. The combination of the base, having a front standard and intermediate standards, the swinging spring arm, hinged to the base and extending forwardly, having an upwardly projecting stem, the spring plate secured to the intermediate standards having a slot in its front portion and forwardly projecting arms formed with hooks, the pressure plate extending over the front standard formed with a tongue engaging through the slot with the spring plate, with side pins with which the hooks engage, and with a finger piece for lifting it, and a marker-head rotatable on the stem, substantially as described.

CAROL H. COGGESHALL.

In presence of—
BENJN. A. KNIGHT,
A. M. EBERSOLE.